(12) United States Patent
Alsbury et al.

(10) Patent No.: US 8,810,574 B2
(45) Date of Patent: Aug. 19, 2014

(54) DISPLAYING PIE CHARTS IN A LIMITED DISPLAY AREA

(75) Inventors: Quinton Alsbury, Venice, CA (US); David Becerra, Venice, CA (US)

(73) Assignee: MeLLmo Inc., Solano Beach, CA (US)

( * ) Notice: Subject to any disclaimer, the term of this patent is extended or adjusted under 35 U.S.C. 154(b) by 1001 days.

(21) Appl. No.: 12/417,616

(22) Filed: Apr. 2, 2009

(65) Prior Publication Data

US 2010/0253686 A1 Oct. 7, 2010

(51) Int. Cl.
 *G06T 11/20* (2006.01)
 *G06G 5/00* (2006.01)
(52) U.S. Cl.
 USPC ............ 345/440; 345/649; 715/215; 715/864
(58) Field of Classification Search
 CPC .......... G06T 11/206; G06T 3/60; G06F 3/048
 USPC ................... 345/649, 659, 440; 715/215, 864
 See application file for complete search history.

(56) References Cited

U.S. PATENT DOCUMENTS

| | | | | |
|---|---|---|---|---|
| 4,674,042 | A | * | 6/1987 | Hernandez et al. ........... 715/209 |
| 5,423,033 | A | * | 6/1995 | Yuen ............................. 707/703 |
| 5,452,414 | A | * | 9/1995 | Rosendahl et al. ........... 715/836 |
| 5,475,810 | A | * | 12/1995 | Sasaki et al. .................. 715/834 |
| 5,825,775 | A | | 10/1998 | Chin et al. |
| 2002/0021278 | A1 | | 2/2002 | Hinckley et al. |
| 2003/0199306 | A1 | * | 10/2003 | Parker ............................. 463/20 |
| 2003/0218619 | A1 | * | 11/2003 | Ben-Tovim ................... 345/649 |
| 2004/0085317 | A1 | * | 5/2004 | Malik et al. .................... 345/440 |
| 2008/0077530 | A1 | * | 3/2008 | Banas et al. ..................... 705/50 |
| 2008/0122796 | A1 | * | 5/2008 | Jobs et al. ..................... 345/173 |
| 2008/0192056 | A1 | | 8/2008 | Robertson et al. |
| 2008/0209546 | A1 | | 8/2008 | Kim |
| 2009/0007006 | A1 | * | 1/2009 | Liu et al. ....................... 715/784 |
| 2009/0070363 | A1 | * | 3/2009 | Bull et al. ..................... 707/102 |
| 2009/0124339 | A1 | * | 5/2009 | Barton et al. ................... 463/20 |
| 2009/0207175 | A1 | * | 8/2009 | Warner ......................... 345/473 |
| 2009/0228841 | A1 | * | 9/2009 | Hildreth ........................ 715/863 |
| 2009/0240355 | A1 | * | 9/2009 | Buil et al. ....................... 700/94 |
| 2009/0262074 | A1 | * | 10/2009 | Nasiri et al. .................. 345/158 |
| 2010/0162152 | A1 | * | 6/2010 | Allyn et al. ................... 715/767 |

OTHER PUBLICATIONS

Anychart.com, http://www.web.archive.org/web/20080331055213/http://www.anychart.com/products/anychart/docs/usersguide/Pie-Donut.html, Mar. 31, 2008.*
PCT International Search Report and Written Opinion, PCT Application No. PCT/US2010/28919, May 4, 2010, 7 pages.
State Intellectual Property Office for the People's Republic of China, First Office Action, Chinese Patent Application No. 201080021818. 1, Oct. 23, 2013, eighteen pages.

\* cited by examiner

*Primary Examiner* — Michelle L Sams
(74) *Attorney, Agent, or Firm* — Fenwick & West LLP

(57) ABSTRACT

A system and a method are disclosed for visually displaying data points using pie charts on a display screen with limited display area. Detailed information is presented for individual sectors compared to other sectors displayed. The sector is selected for displaying detailed information based on its orientation with respect to a centerline axis of the chart. The pie chart can be rotated to cause detailed information to be displayed for different sectors. The mechanism is used to display detailed information of data points for other kinds of charts including multi-series pie charts and donut charts.

19 Claims, 12 Drawing Sheets

DISPLAYING PIE CHARTS IN A LIMITED DISPLAY AREA

BACKGROUND

1. Field of Art

The disclosure generally relates to displaying reports on a device having a display area that is small relative to the amount of data that is being displayed.

2. Description of the Related Art

There are several ways of using charts or graphs to visually present statistical data available in reports including, for example, bar charts, pie charts, line graphs, and scatter graphs. On a mobile device such as a handheld device, handheld computer, cell phone, tablet computer, or personal digital assistant (PDA), graphs and charts have to be displayed on small display screens with display areas that are limited in size compared to the data being shown. There are several challenges in trying to show graphs and charts on such devices. For example, FIG. 1 illustrates a pie chart and some of the obstacles encountered in displaying a pie chart on a small screen. Each sector 100 (also referred to as a slice) in a pie chart corresponds to a data point that represents a percent of the total formed by all the sectors combined. For example, sector 100 represents a data point with value that is 15% of the aggregate of all sectors and sector 110 represents a data point that is 22% of the aggregate of all sectors. The size of a sector is determined based on the value of the corresponding data point. Different sectors may be distinguished by displaying a label associated with each sector. With a limited display area, it may be difficult to display a label adjacent to each sector. Hence a legend 120 may be displayed that allows a viewer to associate the label with a sector based on some property of the sector such as color or shading. Due to limited display area, only a limited precision of the percent corresponding to each sector may be displayed or there may not be sufficient space to display the percent value. It is difficult for a viewer to visually distinguish between two sectors that are very similar in size. Furthermore, the viewer may be interested in knowing the actual value corresponding to the data point along with the percent value corresponding to the sector. It may be difficult to show all the information associated with the data points corresponding to the sectors of the pie chart on a screen with limited display area. The problem is amplified if the number of sectors in the pie chart is large or if the amount of text to be displayed for the values or the labels is large.

SUMMARY

The present invention enables effective display of pie charts on a device having a display area that is small compared to the amount of data being shown in the chart. Examples of suitable devices include tablet computers, smart phone devices, and mobile phones. The pie chart can be rotated based on user input. Sectors of the pie chart may display the percent value associated with the sector. A fixed pointer region is determined with respect to the pie chart. Additional information is displayed for a sector that is aligned with the pointer location, for example, by causing the sector to overlap with the pointer location. The sector that displays additional information is called a magnified sector and the sectors not displaying additional information are called standard sectors. A user can provide different kinds of inputs to cause the pie chart to rotate so as to align a desired sector with the pointer. For example, the user may select a particular sector using a pointing device and the pie chart rotates automatically to cause the selected sector to be aligned with the pointer. In another embodiment the user rotates the pie chart by swiping across the sectors. In another embodiment the user tilts the device displaying the pie chart to rotate the pie chart.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The Figures and the following description relate to various embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
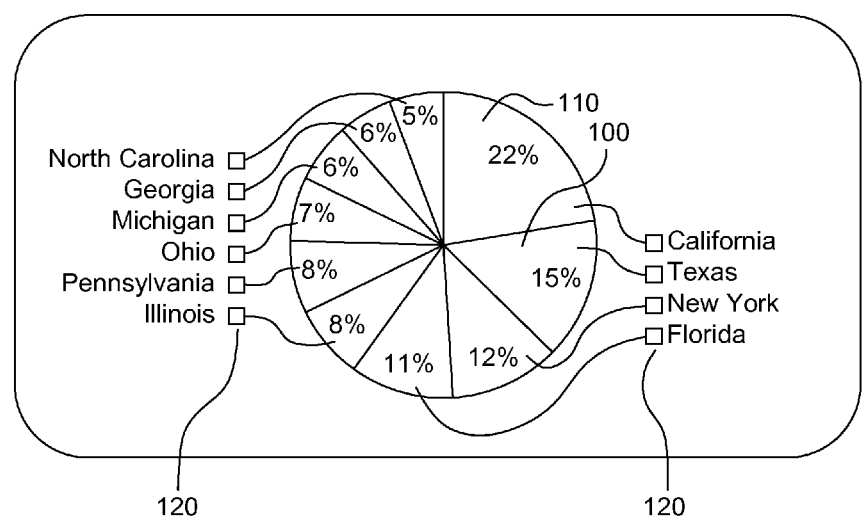
FIG. 1 illustrates a conventional system displaying a pie chart.
Figure 2:
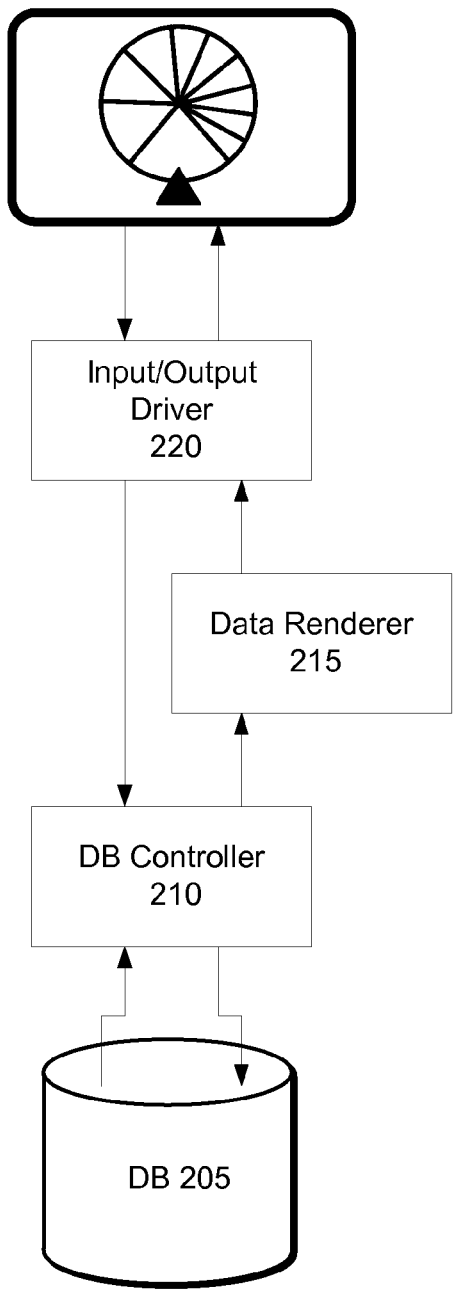
FIG. 2 illustrates one embodiment of the architecture of a system for displaying data as charts.

FIG. 2 is a block diagram of a system architecture in accordance with one embodiment. The components shown in FIG. 2 include a database (DB) 205, a DB controller module 210, a data renderer module 215, an input/output driver module 220 (also referred to as an IO driver module), and a display screen 225. Components such as the display screen 225 are hardware components whereas the DB controller 210 and the chart renderer 215 are software modules. As used herein, the term "module" refers to a computer program logic and/or data for providing the specified functionality. A module can be implemented in hardware, firmware, and/or software. Examples of types of computers that implement the system shown in FIG. 2 include tablet computers, smart phone devices, and mobile phones.

The DB 205 stores data and metadata associated with reports. The DB 205 in one embodiment is implemented using a hard disk drive but can also be implemented using any other device capable of storing data, such as a writeable compact disc (CD) or DVD, or a solid state memory device, for example a flash memory. The DB controller module 210 implements the logic to interface with the DB 205 so as to read data from the DB 205 or write data to the DB 205. The DB controller 210 provides data to the data renderer module 215 which computes information required for rendering the data. For example, the data renderer can determine the dimensions of a pie chart if the data needs to be displayed as a pie chart. The data and the information necessary for rendering the data are provided by the data renderer 215 to the input/output driver 220. The input/output driver 220 provides the display screen 225 with instructions and data necessary for displaying data and/or images. In various embodiments, the display screen 225 is used to input data and/or commands. For example, a touch sensitive screen can sense the coordinates of the portion of the screen touched by a user. The user may touch the display screen 225, for example, to select a command from a list of commands or to select a data element from a list of data elements displayed on the screen. In various embodiments, the display screen 225 can be tilted by the user. The magnitude and direction of tilt of the display screen 225 is detected and can be treated as an input. The angle of the tilt of the display screen is provided to the input/output driver 220 by hardware components such as an accelerometer. In some embodiments, a pointing device, such as a thumbwheel, mouse, track ball, or other type of pointing device is used to input data or commands into the system. The input/output driver 220 sends the data or instructions provided by the display screen 225 to the DB controller 210. The DB controller 210 in response to data or instructions received from the input/output driver 220 reads data from DB 205 and writes data to DB 205.

A mobile device may be used to view reports available to a user. An example scenario allows the user to associate a particular report with a display mode, such as a pie chart, bar chart, or text mode. To allow the user to create an association between the report and a display mode, the user is presented with a list of display modes. The user may make a selection by touching the appropriate portion of the display screen 225 showing a specific mode of display, or by providing input through another mechanism such as a keyboard or pointing device. The DB controller 210 updates the metadata of the appropriate report in the DB 205 to store the information related to mode of display of the report. The information associating the report with a mode of display is used subsequently to display the report.

In another scenario, the user may be presented with a list of reports that can be reviewed. The user selects a particular report name and data renderer 215, computes information to render the data which is then displayed on display screen 225 in the specified format. Various other scenarios of interactions between the user and the various components and modules displayed in FIG. 2 are possible.

Figure 3:
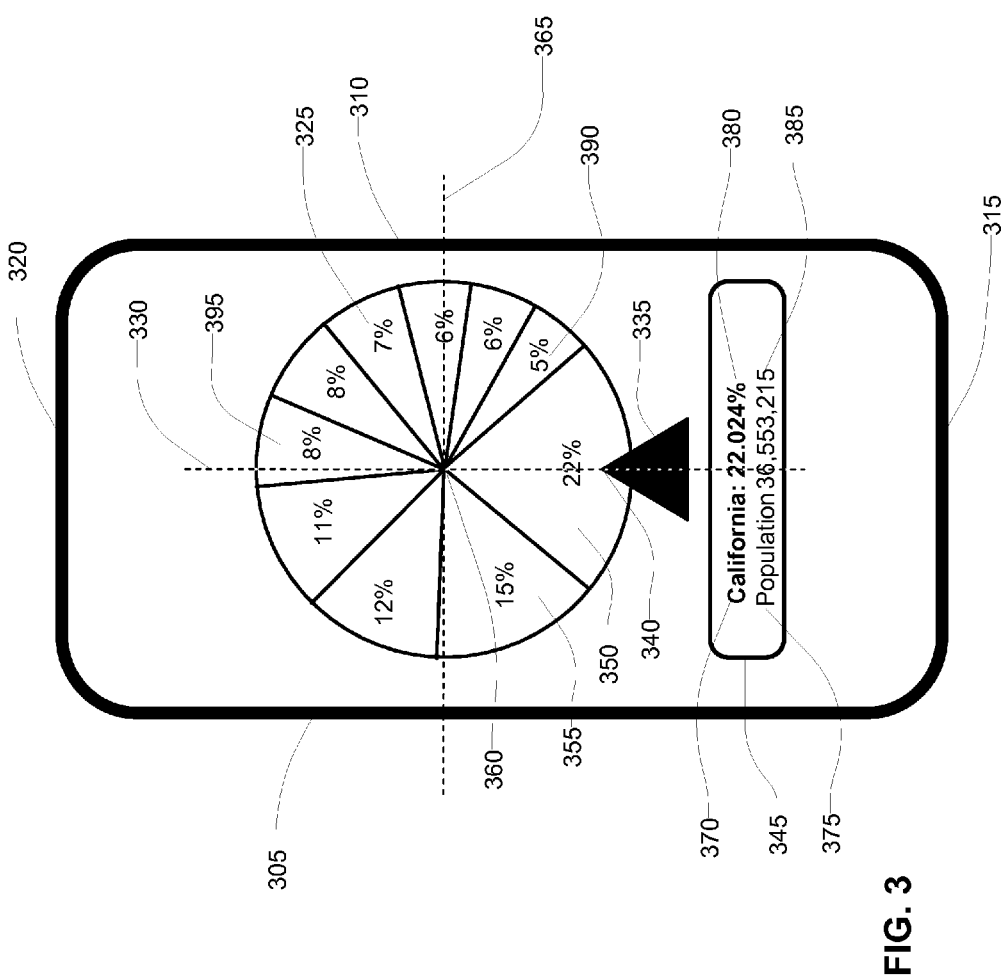
FIG. 3 illustrates how additional information can be displayed for sectors of a pie chart.

FIG. 3 illustrates how information can be displayed for sectors of a pie chart for effectively presenting a visual representation of a report using a pie chart. The display screen comprises four edges, a left edge 305, a right edge 310, a top edge 320, and a bottom edge 315. Note that the naming of an edge, e.g., as a "bottom", is for clarity of description—a particular device may support use in multiple orientations, in which case the physical edge of the device that is the "bottom" or "top" in one orientation can easily become a different edge in an alternative orientation. Our description here is not intended to be limited to a particular orientation. The chart is displayed in an area enclosed within the edges of the display screen.

Figure 4:
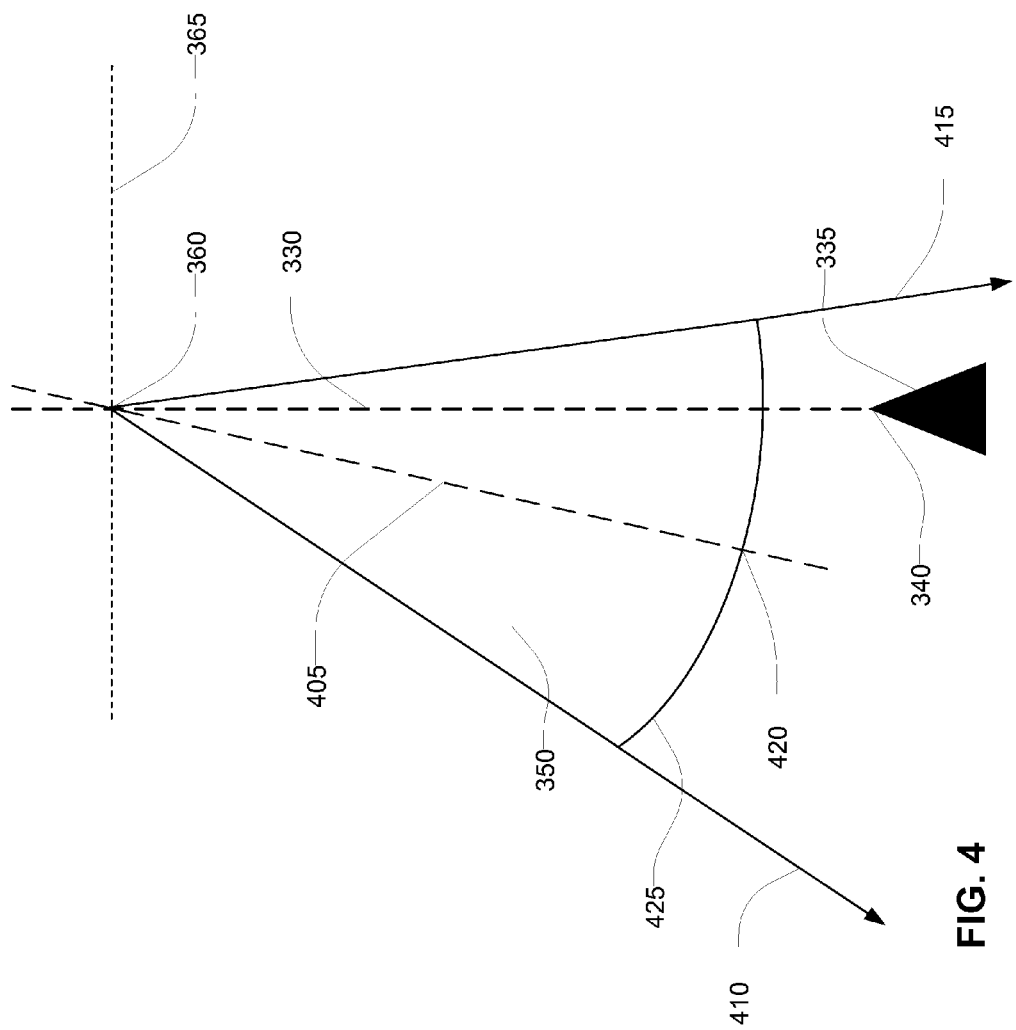
FIG. 4 illustrates how a sector is selected for magnification.

The pie chart can be rotated based on user input or automatically. A pointer 335 is displayed in a fixed region of the display screen 225. A sector 350 of the pie chart is selected based on its position in relation to the pointer 335 to display additional information 345 associated with the sector. The sector that displays additional information, for example, sector 350 in FIG. 3 is called a magnified sector whereas a sector not displaying additional information similar to 345 is called a standard sector 355. The pointer can be a region that has a vertex (or a tip), for example, the pointer can be a triangular region as displayed in FIG. 3 with tip 340 or an arrow. FIG. 4 illustrates how the sector to be magnified may be selected in one embodiment. As shown in FIG. 4, the sector 350 selected for magnification is the sector enclosing the tip 340 of the pointer 335 within an angle formed by the extended sides 410 and 415 of the sector. The sector 350 positioned with respect to the pointer 335 as shown in FIG. 4 is considered aligned with respect to the pointer and is selected for magnification. The pointer region may or may not overlap with sectors of the pie chart. For example, the pointer region may be displayed below the pie chart without overlapping with the pie chart. In some embodiments, the pointer region is used for determining the sector to be magnified but not displayed explicitly on the display screen 225.

The sector to be magnified may be selected based on other criteria described here. The pointer 335 can be associated with a centerline axis 330 that divides the pie chart into two symmetric halves and passes through the tip 340 of the pointer. We assume a horizontal axis 365 that bisects the pie chart and is parallel to the lower edge 315 and upper edge 320. A sector is predominantly on a particular side of an axis if at least half of the area of the sector is on that side of the axis. The following discussion applies to sectors that are predominantly below the horizontal axis 365, closer to the lower edge 315 unless stated otherwise. This distinction is made because the centerline axis may pass through two sectors, a sector, for example, 350 below the horizontal axis and a sector, for example, 395 above the horizontal axis. For simplicity, the following discussion focuses on the sector that is predominantly below the horizontal axis since the pointer is displayed below the horizontal axis. In one embodiment, the sector that is magnified is the sector below the horizontal axis 365 through which the centerline axis 330 passes. Each sector can be associated with an axis of symmetry 405 existing in the plane of the sector that divides the sector into two symmetric halves. In a circular pie chart as shown in FIG. 3, the axis of symmetry 405 of each sector passes through the center of the pie chart. As a pie chart is rotated, the axis of symmetry of a sector also rotates around the center of the pie chart. In some embodiments, a rotation of the pie chart causes sectors to pass through the centerline axis 330. If the pie chart stops rotating, the sector through which the centerline axis 330 passes may be rotated until its axis of symmetry 405 coincides with the centerline axis 330. In some embodiments, the pie chart is continued to rotate in the direction it was rotating until the next sector is positioned to cause its axis of symmetry 405 to coincide with the centerline axis 330.

When the pie chart is rotating, the transition of a standard sector to a magnified sector results in a visual or audio feedback being provided to the user. For example, whenever a sector is magnified an audio sound may be generated or the magnified sector may be displayed with a different color, shading or using any visual mechanism that distinguishes the magnified sector from other sectors. In some embodiments, the audio or visual signal is provided when the axis of symmetry 405 of the magnified sector coincides with the centerline axis 330 or is within a predetermined angle of the centerline axis 330.

As shown in FIG. 3, each sector can display the percent of the pie chart occupied by the sector. In some embodiments, the percent value associated with a sector may not be displayed overlaying the sector if the size of the sectors is too small to display the percent value in an aesthetically pleasing manner. Alternatively the percent value associated with the sector may not be displayed for any sector. In some embodiments the magnified sector can be displayed by an icon with a radius larger than that of a standard sector. In other embodiments, the magnified sector may be distinguished compared to other sectors with a different color or shading. The information 345 displayed for the magnified sector includes the label for the sector 370, information associated with the data displayed 375, percent value of the sector compared to the pie chart 380, and the actual value 385 corresponding to the data point associated with the sector. Note that the percent value 380 displayed as part of information 345 can have higher precision compared to the percent value 390 displayed in a sector since data displayed as part of information 345 can occupy a larger display area.

Figure 5:
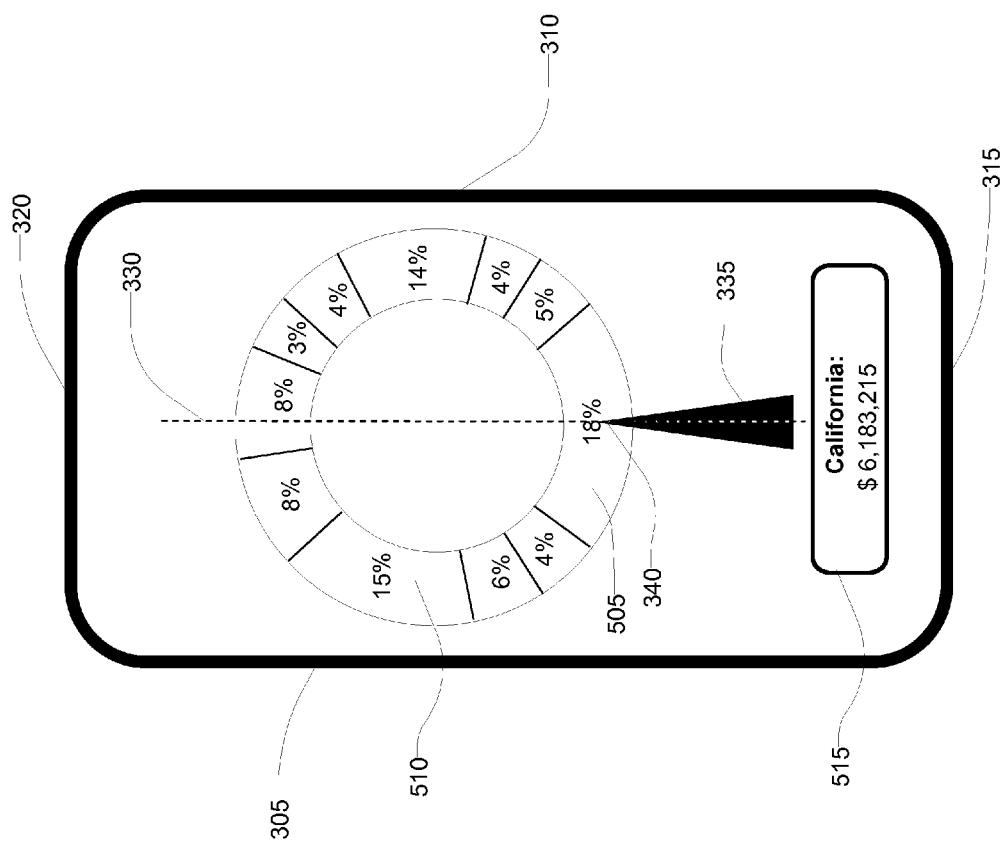
FIG. 5 illustrates how additional information can be displayed for sectors of a donut chart.
Figure 6:
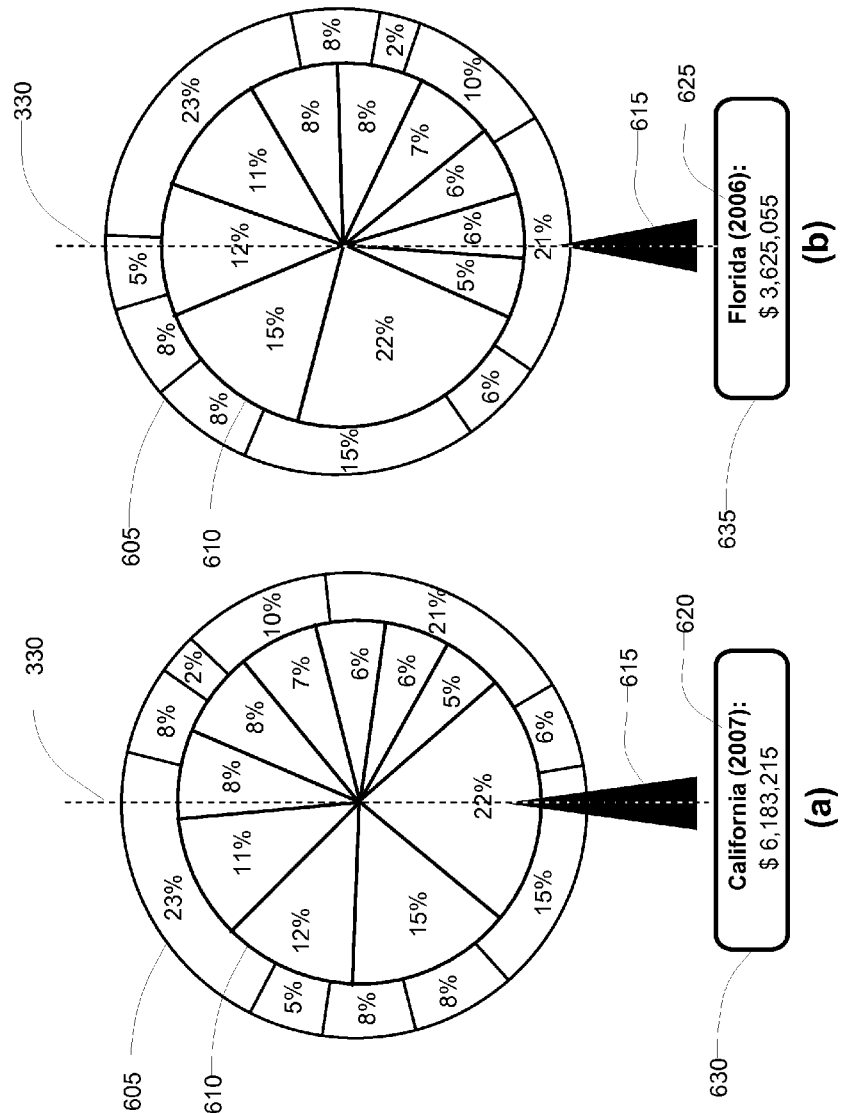
FIG. 6 shows an embodiment displaying detailed information for sectors of a multi-series pie chart.

Some alternative embodiments show more than one sector magnified using the sector magnification mechanism described above. For example, two pointers may be associated with a pie chart, thereby magnifying two sectors of the pie chart at the same time. There are other charts similar to pie charts based on a region divided into slices that can be effectively presented using the sector magnification mechanism described above. For example, a donut chart displayed in FIG. 5 can also be provided with a mechanism to rotate the chart such that a specific slice of the donut is magnified based on its position with respect to the pointer 335 or its position with respect to the centerline axis 330. The slice 505 closest to the tip 340 of the pointer 335 is magnified to display additional information 515 compared to other slices 510. A slice 510 may display a percent value representing the fraction of the value corresponding to the slice compared to the aggregate value of all slices. Another embodiment allows a multi-series pie chart as shown in FIG. 6 to be effectively presented using magnification of individual sectors. As shown in FIG. 6, a multi-series pie chart can be viewed as a series of pie charts of different sizes overlapping each other so as not to completely hide any chart. Two different pie charts 605 and 610 in a multi-series pie chart may represent two different data sets obtained by changing a particular dimension, for example, data sets taken during different time intervals. One embodiment allows the user to associate a pointer 615 to a single pie chart from the multi-series pie chart at a time so as to allow magnification of sectors of the associated pie chart. FIG. 6(*a*) shows the pie chart 610 being associated with the pointer 615 whereas FIG. 6(*b*) shows the pie chart 605 being associated with the pointer 615. In FIG. 6, the different pie charts of the multi-series pie chart overlap each other such that the centers of the pie charts coincide and the center-line axes for the pie charts overlap. The user may be allowed to rotate either the complete set of pie charts or the pie chart associated with the pointer. A sector of the pie chart associated with the pointer 615 is selected for magnification based on the position of the sector with respect to the pointer 615 or the position of a sector with respect to a centerline axis 330 of the pie chart. The displayed information 630 shows the time interval 620 associated with the data set of pie chart 610; similarly information 635 shows the time interval 625 associated with the data set of pie chart 605. Another embodiment may display multiple pointers, where each pointer is associated with a different pie chart of the multi-series pie chart and causes detailed information to be displayed for a magnified sector of the associated pie chart. A three dimensional pie chart may be visualized as an elliptical pie chart and the mechanism of individual sector magnification can be appropriately modified for elliptical pie charts. Other pie charts that are not circular can be effectively presented using the sector magnification mechanism by approximating individual slices of the pie charts by sectors.

Figure 7:
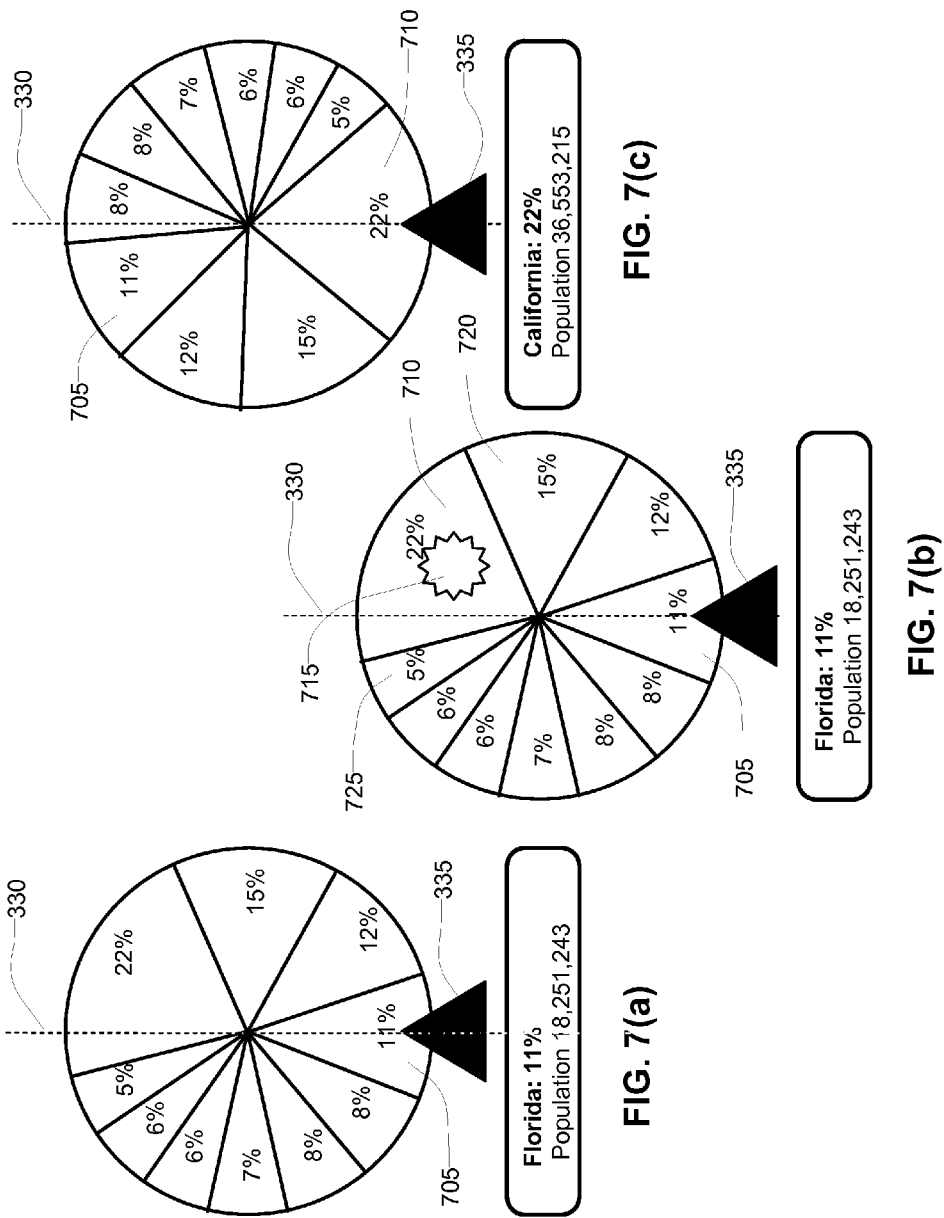
FIG. 7 shows how a user can select a particular sector of a pie chart to view additional information associated with the sector.
Figure 8:
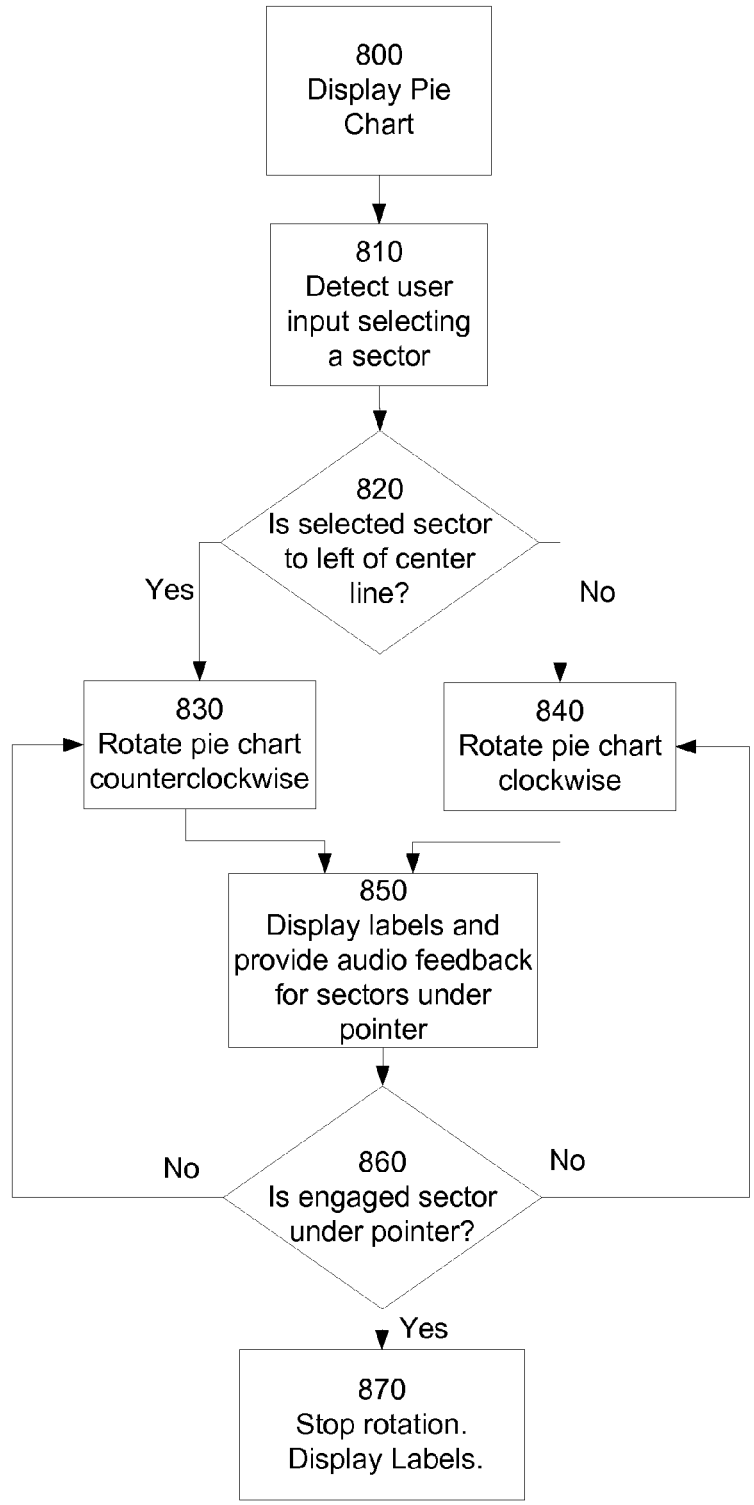
FIG. 8 shows a flowchart describing an embodiment of the process for determining how a pie chart is rotated based on user input selecting a sector for displaying additional information associated with the sector.

A user interested in viewing additional information associated with a standard sector can magnify the sector by providing input indicating which sector needs to be magnified. For example, the user can indicate the sector to be magnified by clicking on or touching a region within the sector using a pointing device, for example, a thumbwheel. The pie chart is re-oriented appropriately to show the selected sector aligned with the pointer and magnified. FIG. 7 describes how a user can indicate the sector of the pie chart to be magnified by selecting it and FIG. 8 describes a flowchart illustrating the corresponding steps. FIG. 7(*a*) displays 800 the pie chart where sector 705 is aligned with the pointer 335 and is displayed as a magnified sector. FIG. 7(*b*) illustrates input provided by the user by clicking on the sector 710 in region 715. In some embodiments the region 715 can be any region enclosed within the sector 710. In other embodiments, 715 can be any region within a subset of sector 710 that excludes any area within a predetermined distance of the adjacent sectors 720 and 725. Excluding areas close to the adjacent sectors reduces the chances of accidentally selecting sector 710 when the user intention is to select one of the adjacent sectors, especially if the adjacent sectors are small. The user input is detected 810 by the input/output driver 220. Responsive to the user input, the pie chart is rotated to cause the selected sector 710 to be aligned with the pointer 335 causing the sector 710 to be magnified. The direction in which the pie chart is rotated is determined 820 based on the position of the selected sector 710 with respect to the centerline 330. If the selected sector is predominantly to the left of the centerline, the pie chart is rotated 830 counterclockwise, else it is rotated clockwise 840. A sector that is equally divided by the centerline axis can be rotated in any direction picked randomly. Hence, in one embodiment the pie chart is rotated in the direction that aligns the selected sector to the pointer with minimum rotation, causing the selected sector to travel the shortest distance. In another embodiment, the chart may be rotated in the opposite direction, causing the sector to travel greater distance. As the pie chart is rotated, each sector that gets aligned with the pointer 335 displays 850 additional details associated with the sector. In some embodiments, the sector that gets aligned to the pointer 335 provides an audio or visual feedback, for example, a particular sound or a change in color or shading of the sector. As the pie chart is rotated, a conditional check 860 is performed to determine if the selected sector 710 is aligned with the pointer 335. If the selected sector 710 is not aligned with the pointer, the pie chart is continued to be rotated. The pie chart rotation is stopped 870 when the selected sector 710 is aligned with the pointer 335 and hence gets magnified. In some embodiments, the selected sector is aligned with the pointer without displaying any rotation of the pie chart, by simply redisplaying the pie chart in the new orientation.

Figure 9:
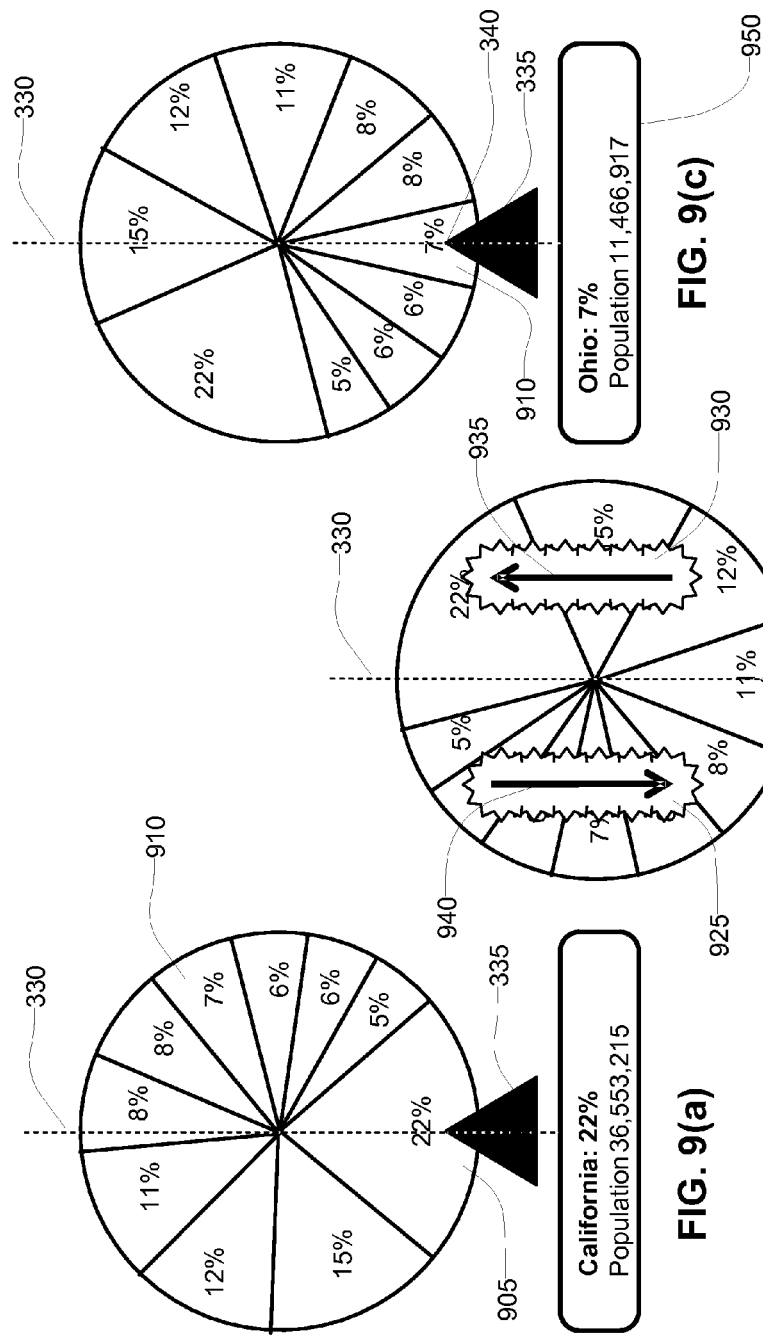
FIG. 9 illustrates how a user can rotate a pie chart thereby causing a specific sector to display additional information.
Figure 10:
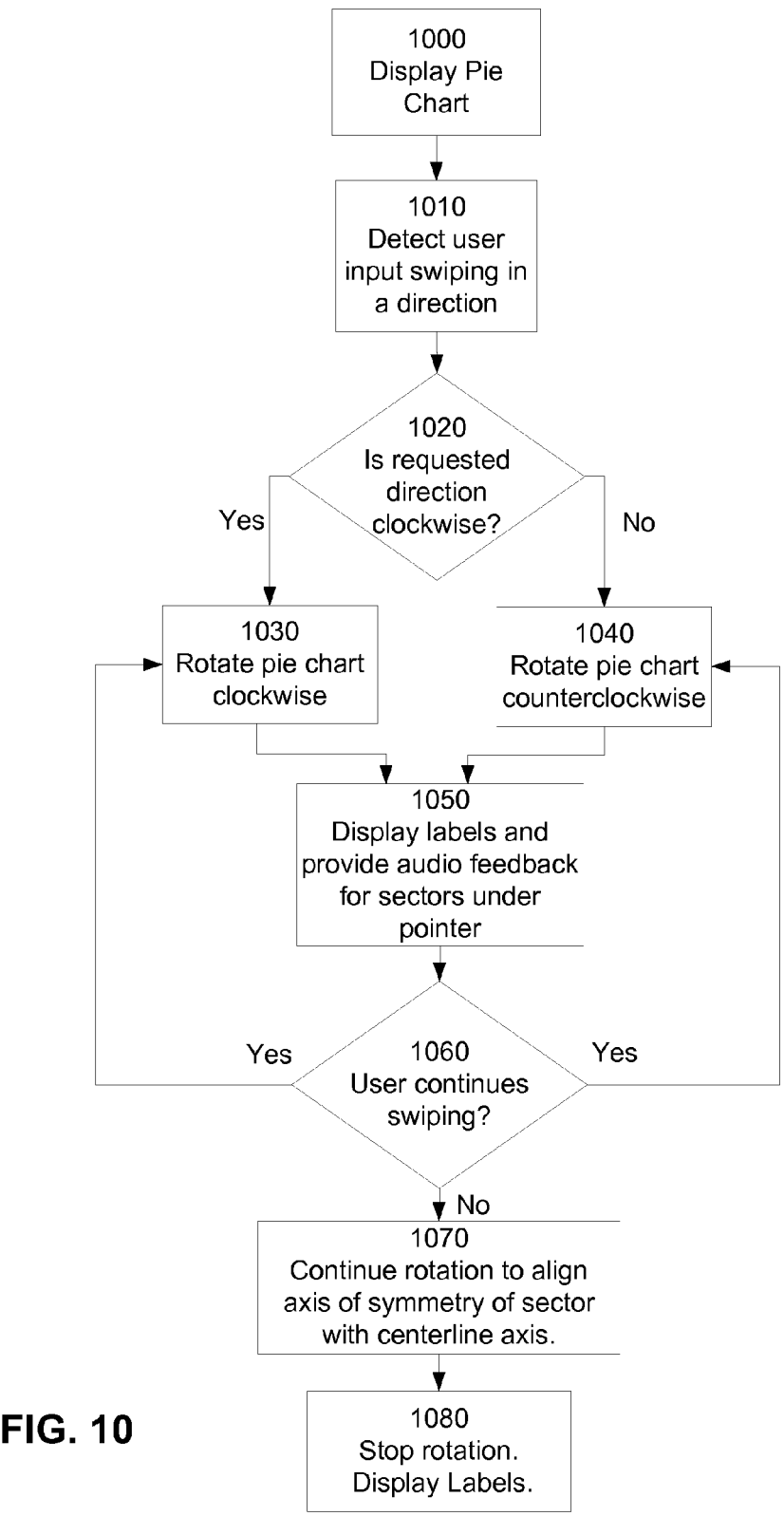
FIG. 10 shows a flowchart describing an embodiment of how user input for rotating a pie chart can be received to cause detailed information to be displayed for a sector.

In another embodiment, the user can indicate the sector to be magnified by dragging the pie chart and rotating it to manually align the sector to the pointer. Once the user stops dragging the pie chart, the pie chart rotates automatically to cause the appropriate sector to align its axis of symmetry with the pointer. FIG. 9 illustrates how a user can provide input to cause a pie chart to rotate so as to align a sector to the pointer 335 and FIG. 10 describes a flowchart illustrating the corresponding steps. FIG. 9(*a*) displays 1000 the pie chart with sector 905 aligned with pointer 335 and magnified. A user interested in viewing additional information about sector 910 by causing the pie chart to rotate thereby moving sector 910 to be aligned to the pointer 335. The user can cause the pie chart to rotate by a swiping motion of the pointing/selecting device in a particular direction in a region 925 or 930 across the sectors of the pie chart. In some embodiments, the pointing device can be the user's finger if the display screen 225 is touch-sensitive. The input provided by the user is detected 1010 by the input/output driver 220. The direction of swiping corresponds to the intended direction of rotation, for example, the arrows 940, 935 indicate a counterclockwise direction of rotation. A user swiping in the direction opposite to arrows 940, 935 indicates a clockwise direction of rotation of the pie chart. In one embodiment, the speed of rotation of the pie chart is determined by the magnitude or the speed of the swiping motion. The requested direction of rotation is checked 1020 by the input/output driver 220 and the pie chart rotated 1030, 1040 accordingly. In some embodiments, as the pie chart rotates, each sector 915 that gets aligned to the pointer 335 displays additional information 945 associated with the sector 915 and provides 1050 an audio or visual feedback, for example, a particular sound or a change in color or shading of the sector. If the user continues providing 1060 the input corresponding to the swiping motion of the pointing device, the pie chart is continued to be rotated. When the appropriate sector 910 to be magnified is aligned with the pointer 335, the user can stop the swiping motion of the pointing device so as to stop the rotation of the pie chart. The pie chart may be automatically rotated 1070 until the axis of symmetry of the sector 910 is aligned with the centerline axis of the pie chart. The pie chart rotation stops 1080 when the axis of symmetry of the sector 910 is aligned with the centerline axis of the pie chart and the additional information 950 associated with the sector 910 displayed. Alternatively the additional information 950 associated with the sector 910 can be displayed when the tip of the pointer 340 falls within the extended sides of the angle of the sector 910.

Figure 11:
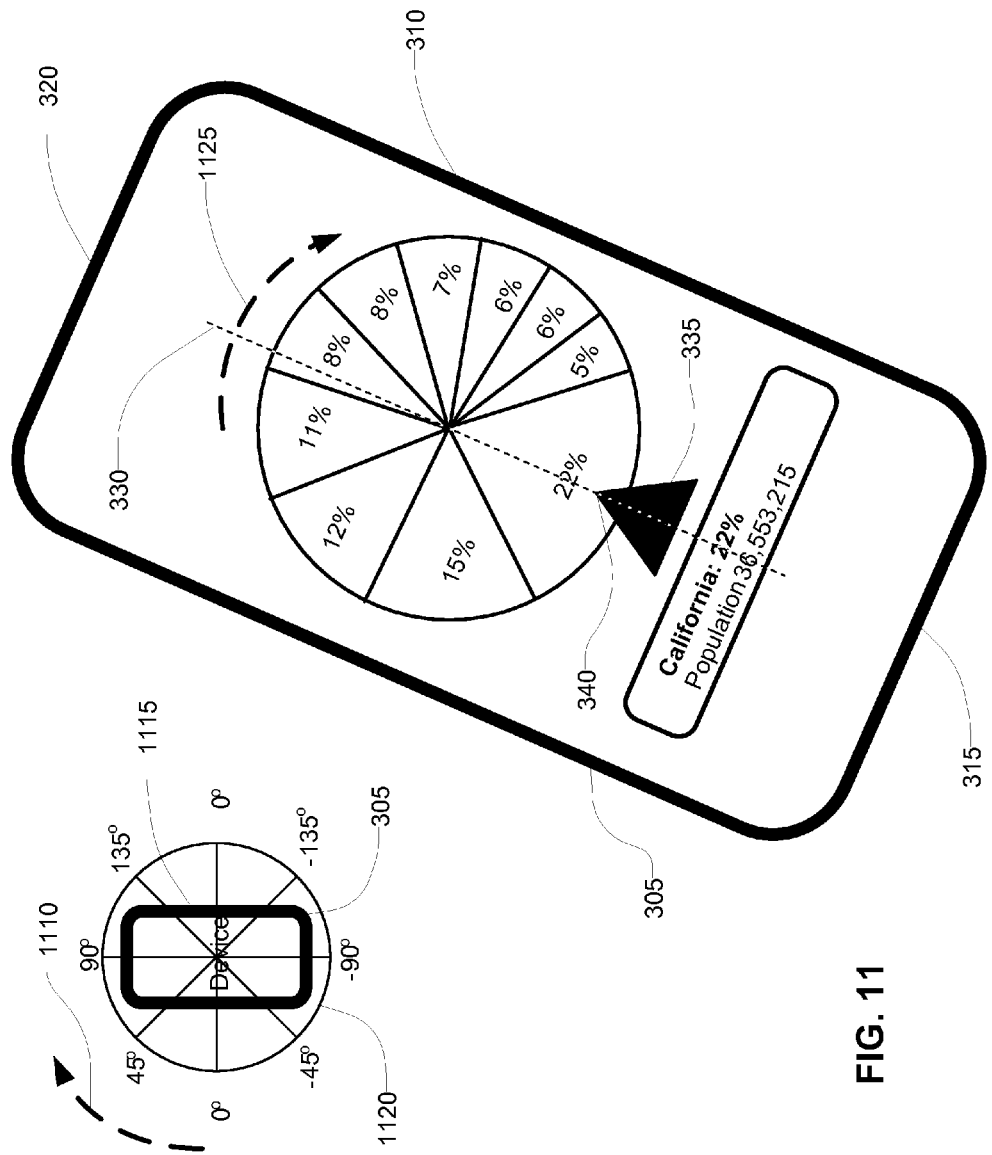
FIG. 11 shows how tilting the device in a particular direction can cause the pie chart to rotate in a particular direction.
Figure 12:
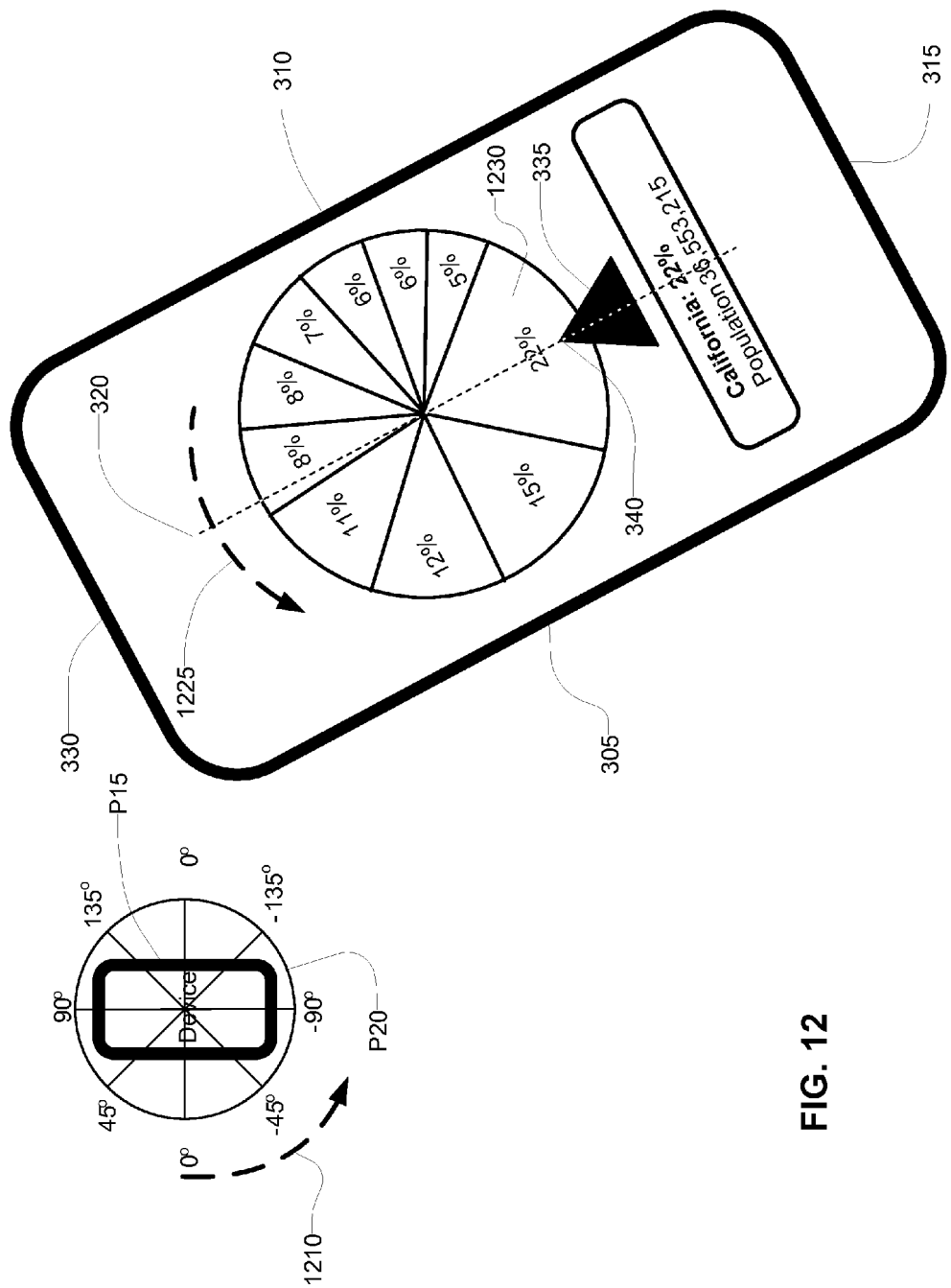
FIG. 12 shows how tilting the device in a direction opposite of that shown in FIG. 11 causes the pie chart to rotate in a direction opposite of that shown in FIG. 11.

FIG. 11 illustrates an embodiment that activates rotation of the pie chart by tilting the display screen 225. The direction in which the pie chart rotates is determined by the angle of tilt. The device 1115 shown in FIG. 6 can be tilted along any of the angles drawn along the circle 1120. The arrow 1110 indicates that the angle of tilt is a positive angle less than 90°. As shown in FIG. 11, the tilt may cause the left edge 305 to be higher than the right edge 310. The tilt at the angle illustrated by arrow 1110 causes the direction of rotation of the pie chart to be 1125. The user may choose to change the angle to tilt back to 0° to stop the pie chart rotation. Once the rotation stops, the desired sector may already be aligned with the pointer 335. If the sector is not aligned with the pointer 335, the user may further rotate the pie chart by swiping with a pointing device as illustrated in FIG. 9. FIG. 12 illustrates how the angle of tilt can be negative as shown by the arrow 1210 causing the pie chart to rotate in direction 1225, opposite to the direction 1125.

In one embodiment, the speed of rotation is determined by the magnitude of the angle of tilt. For example, in FIG. 11, if the angle of tilt 1110 is selected to be 80°, the speed at which the pie chart rotates is higher than the speed if the angle 1110 was 10°. The user may start with a large angle of tilt to rotate faster in the beginning. The angle of tilt may be reduced as the desired sector gets closer to the pointer 335. The angle of tilt may be reduced to zero when the tip 340 of the pointer 335 is within the extended angle of the sector 1230 intended to be magnified. In certain embodiments, the speed at which the pie chart rotates has a minimum or a maximum limit or both. For example, the smallest amount of tilt detected causes the pie chart to rotate at or above the minimum speed. Similarly, the maximum tilt for example, either 90° or −90° does not cause the pie chart to rotate any faster than the maximum rotation speed. The minimum and the maximum speed of rotation of the pie chart can be predetermined for a system or configured by the user.

It is to be understood that the Figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying pie charts through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method of displaying a pie chart on a display screen of a mobile device, the method comprising:
   receiving a report including a data set related to a plurality of data points;
   rendering a pie chart including a plurality of sectors, the rendering based on the report such that each sector of the pie chart is associated with at least a data point;
   displaying the pie chart on the display screen in a first orientation having a first sector aligned with an axis of the pie chart, a relative size of the first sector proportional to a value of the data point associated with the first sector, wherein first additional information associated with the first sector is displayed in addition to the pie chart, the first additional information including the value of the data point associated with the first sector;
   receiving a user input selecting a second sector of the pie chart, a relative size of the second sector proportional to a value of the data point represented by the second sector;
   responsive to receiving the selection of the second sector, rotating, by a computer processor, the pie chart to a second orientation having the second sector of the pie chart aligned with the axis of the pie chart; and
   responsive to the second sector being aligned with the axis of the pie chart, displaying on the display screen second additional information describing the second sector in addition to the pie chart and not displaying the first additional information, the second additional information including the value of the data point associated with the second sector.

2. The method of claim 1 wherein the pie chart is rotated from the first orientation to the second orientation, and the method further comprising:
   for each sector that aligns with the axis of the pie chart as the pie chart is rotated, displaying additional information describing the sector.

3. The method of claim 1, wherein the user input includes a swiping gesture across the chart.

4. The method of claim 3, wherein the speed of the rotation of the chart region is determined by the user input.

5. The method of claim 1, further comprising:
   determining a direction of rotation that causes minimum rotation from the first orientation to the second orientation; and
   rotating the pie chart along the determined direction of rotation.

6. The method of claim 1, further comprising:
   displaying a pointer region that is fixed with respect to the pie chart and is displayed adjacent to a sector that displays additional information.

7. The method of claim 1, wherein the pie chart is rotated from the first orientation to the second orientation until a fixed centerline axis passing through the pie chart coincides with a sector axis passing through the second of the plurality of sectors.

8. The method of claim 1, wherein an audio feedback is provided as the chart is rotated each time a fixed centerline axis passing through the pie chart coincides with a side of a sector.

9. The method of claim 1, wherein an audio feedback is provided as the chart is rotated each time a fixed centerline axis passing through the pie chart coincides with a sector axis passing through a sector.

10. The method of claim 1, further displaying on the display screen an overlapping pie chart, the overlapping pie chart including an overlapping plurality of sectors, the method further comprising:
   displaying the overlapping pie chart on the display screen in a first orientation, wherein third additional information associated with a first of the overlapping plurality of sectors is displayed in addition to the overlapping pie chart; and
   responsive to receiving a user input, displaying the overlapping pie chart in a second orientation, wherein fourth additional information associated with a second of the overlapping plurality of sectors is displayed in addition to the overlapping pie chart, and the third additional information is not displayed.

11. The method of claim 1, wherein a sector displays a first numeric value of the associated data point and wherein an additional information describing the sector comprises a second numeric value having a higher precision corresponding to the first numeric value.

12. The method of claim 1, wherein a sector aligned with the axis of the pie chart is displayed as having a radius greater than a sector not aligned with the axis of the pie chart.

13. A computer implemented method of displaying a donut chart on a display screen of a mobile device, the method comprising:
   receiving a report including a data set related to a plurality of data points;
   rendering a donut chart including a plurality of slices, the rendering based on the report such that each slice of the donut chart is associated with at least a data point;

displaying the donut chart on the display screen in a first orientation having a first slice aligned with an axis of the donut chart, a relative size of the first slice proportional to a value of the data point associated with the first slice, wherein first additional information associated with the first slice is displayed in addition to the donut chart, the first additional information including the value of the data point associated with the first slice;

receiving a user input selecting a second slice of the donut chart, a relative value of the second slice proportional to a value of the data point associated with the second slice;

responsive to receiving the selection of the second slice, rotating, by a computer processor, the donut chart to a second orientation having the second slice of the donut chart aligned with the axis of the donut chart; and responsive to the second slice being aligned with the axis of the donut chart, displaying second additional information describing the second slice in addition to the donut chart and not displaying the first additional information, the second additional information including the value of the data point associated with the second slice.

14. A system for displaying on a display screen of a mobile device a chart representing a plurality of data points, the system comprising:

a computer processor; and a computer-readable storage medium storing computer program modules configured to execute on the computer processor, the computer program modules comprising:

an input/output driver module configured to:

receive a report including a data set related to a plurality of data points;

render a pie chart including a plurality of sectors, the rendering based on the report such that each sector of the pie chart is associated with at least a data point;

display the pie chart on the display screen in a first orientation having a first sector aligned with an axis of the pie chart, a relative size of the first sector proportional to a value of the data point associated with the first sector, wherein first additional information associated with the first sector is displayed in addition to the pie chart, the first additional information including the value of the data point associated with the first sector;

receive a user input selecting a second sector of the pie chart, a relative size of the second sector proportional to a value of the data point associated with the second sector;

responsive to receiving the selection of the second sector, rotate the pie chart to a second orientation having the second sector of the pie chart aligned with the axis of the pie chart; and responsive to the second sector being aligned with the axis of the pie chart, display on the display screen second additional information describing the second sector in addition to the pie chart and not displaying the first additional information, the second additional information including the value of the data point associated with the second sector.

15. The system of claim 14, wherein the pie chart is rotated from the first orientation to the second orientation, wherein the input/output driver module is further configured to, for each sector that aligns with the axis of the pie chart as the pie chart is rotated, display additional information describing the sector.

16. The system of claim 15, wherein the speed of the rotation of the chart region is determined by the user input.

17. The system of claim 14, wherein the input/output driver module is further configured to:

determine a direction of rotation that causes minimum rotation from the first orientation to the second orientation; and rotate the pie chart along the determined direction.

18. The system of claim 14, wherein the input/output driver module is configured to further:

display a pointer region that is fixed with respect to the pie chart and is displayed adjacent to a sector that displays additional information.

19. A computer program product having a non-transitory computer-readable storage medium storing computer-executable code for displaying on a display screen of a mobile device a chart representing a plurality of data points, the code comprising:

an input/output driver module configured to:

receive a report including a data set related to a plurality of data points;

render a pie chart including a plurality of sectors, the rendering based on the report such that each sector of the pie chart is associated with at least a data point;

display the pie chart on the display screen in a first orientation having a first sector aligned with an axis of the pie chart, a relative size of the first sector proportional to a value of the data point associated with the first sector, wherein first additional information associated with the first sector is displayed in addition to the pie chart, the first additional information including the value of the data point associated with the first sector;

receive a user input selecting a second sector of the pie chart, a relative size of the first sector proportional to a value of the data point associated with the first sector;

responsive to receiving the selection of the second sector, rotate the pie chart to a second orientation having the second sector of the pie chart aligned with the axis of the pie chart; and responsive to the second sector being aligned with the axis of the pie chart, display on the display screen second additional information describing the second sector in addition to the pie chart and not displaying the first additional information, the second additional information including the value of the data point associated with the second sector.

* * * * *